(12) United States Patent  (10) Patent No.: US 8,163,419 B2
Marukawa et al.  (45) Date of Patent: Apr. 24, 2012

(54) BATTERY PACK

(75) Inventors: Shuhei Marukawa, Toyohashi (JP);
Toshiaki Nakanishi, Toyohashi (JP)

(73) Assignee: Panasonic EV Energy Co., Ltd.,
Kosai-shi (JP)

( * ) Notice: Subject to any disclaimer, the term of this patent is extended or adjusted under 35 U.S.C. 154(b) by 9 days.

(21) Appl. No.: 12/635,611

(22) Filed: Dec. 10, 2009

(65) Prior Publication Data

US 2010/0151309 A1   Jun. 17, 2010

(30) Foreign Application Priority Data

Dec. 17, 2008  (JP) ................................. 2008-320430

(51) Int. Cl.
*H01M 10/50* (2006.01)
(52) U.S. Cl. ...................................................... 429/120
(58) Field of Classification Search .................... 429/120
See application file for complete search history.

(56) References Cited

U.S. PATENT DOCUMENTS

| | | | |
|---|---|---|---|
| 6,818,343 B1 * | 11/2004 | Kimoto et al. | 429/99 |
| 2003/0162084 A1 | 8/2003 | Shigeta | |
| 2006/0210868 A1 * | 9/2006 | Kim et al. | 429/120 |
| 2008/0124622 A1 | 5/2008 | Hamada | |
| 2010/0151307 A1 * | 6/2010 | Naganuma | 429/99 |

FOREIGN PATENT DOCUMENTS

| | | |
|---|---|---|
| JP | 2003-223938 A | 8/2003 |
| WO | 2006/087962 A1 | 8/2006 |

* cited by examiner

*Primary Examiner* — Gregg Cantelmo
(74) *Attorney, Agent, or Firm* — Christensen O'Connor Johnson Kindness PLLC (57) ABSTRACT

A battery pack comprises a plurality of battery modules and a holding spacer which holds the battery module. A plurality of projections are provided on the holding spacer. The projections contact the battery module to hold the battery module and form a flow path for a coolant. A heat generating structure is embedded in the holding spacer or inserted into a hollow section of the holding spacer. In a cold climate, electricity is applied to the heat generating structure, to heat the battery module.

7 Claims, 9 Drawing Sheets

BATTERY PACK

PRIORITY INFORMATION

This application claims priority to Japanese Patent Application No. 2008-320430, filed on Dec. 17, 2008, which is incorporated herein by reference in its entirety.

BACKGROUND OF THE INVENTION

1. Field of the Invention

The present invention relates to a battery pack in which a plurality of battery modules each having a plurality of cells are stacked with a gap therebetween, and in particular, to a battery pack in which a spacer for holding a battery module is placed between adjacent battery modules.

2. Description of the Related Art

In the related art, there is known a battery pack wherein a plurality of battery modules each having a plurality of cells are placed, and a spacer is placed between adjacent battery modules. The battery pack is, for example, a secondary battery (such as a nickel-metal hydride battery or a lithium ion battery) which is used as a power supply of an electric vehicle and a hybrid electric vehicle.

Figure 9:
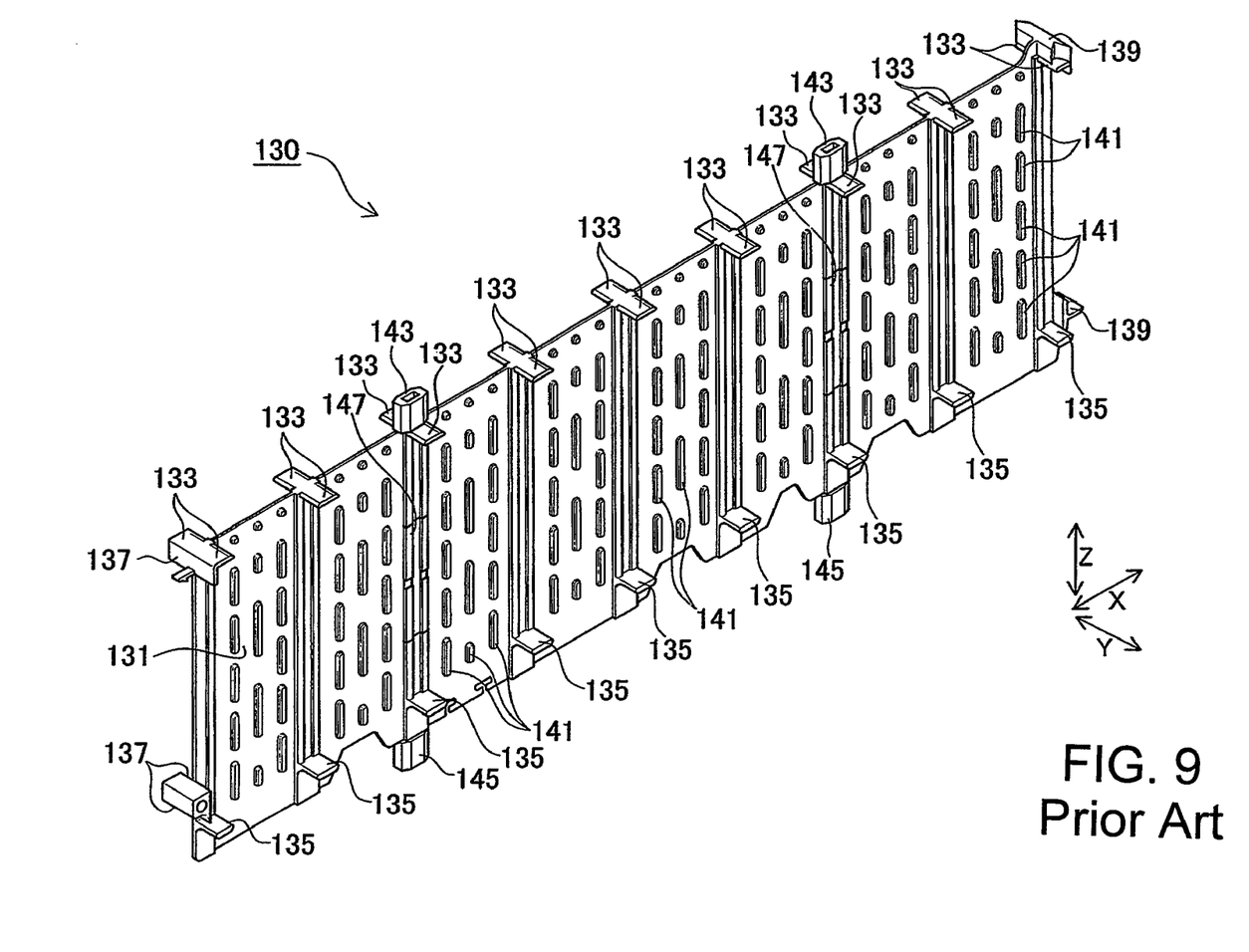
FIG. 9 is a perspective view of a holding spacer of related art.
Figure 10:
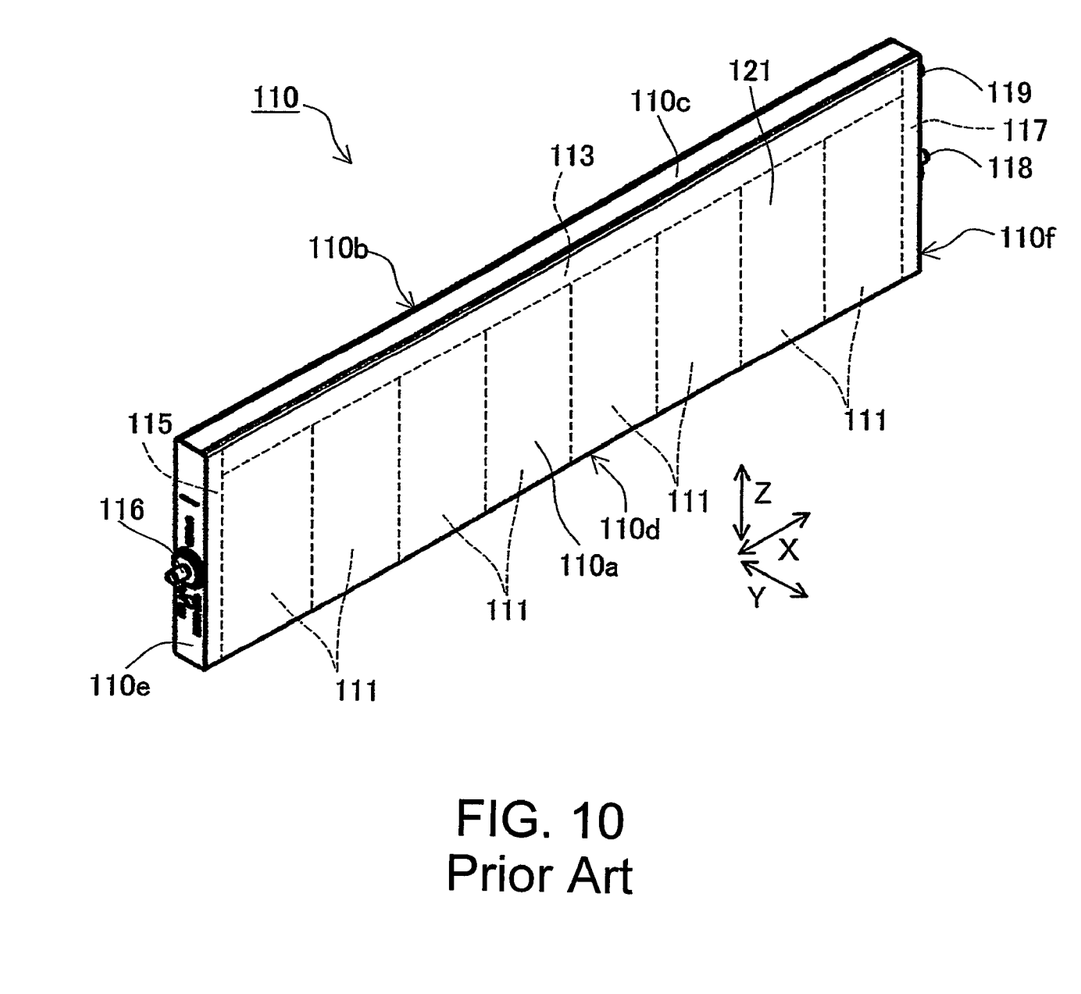
FIG. 10 is a perspective view of a battery module.
Figure 11:
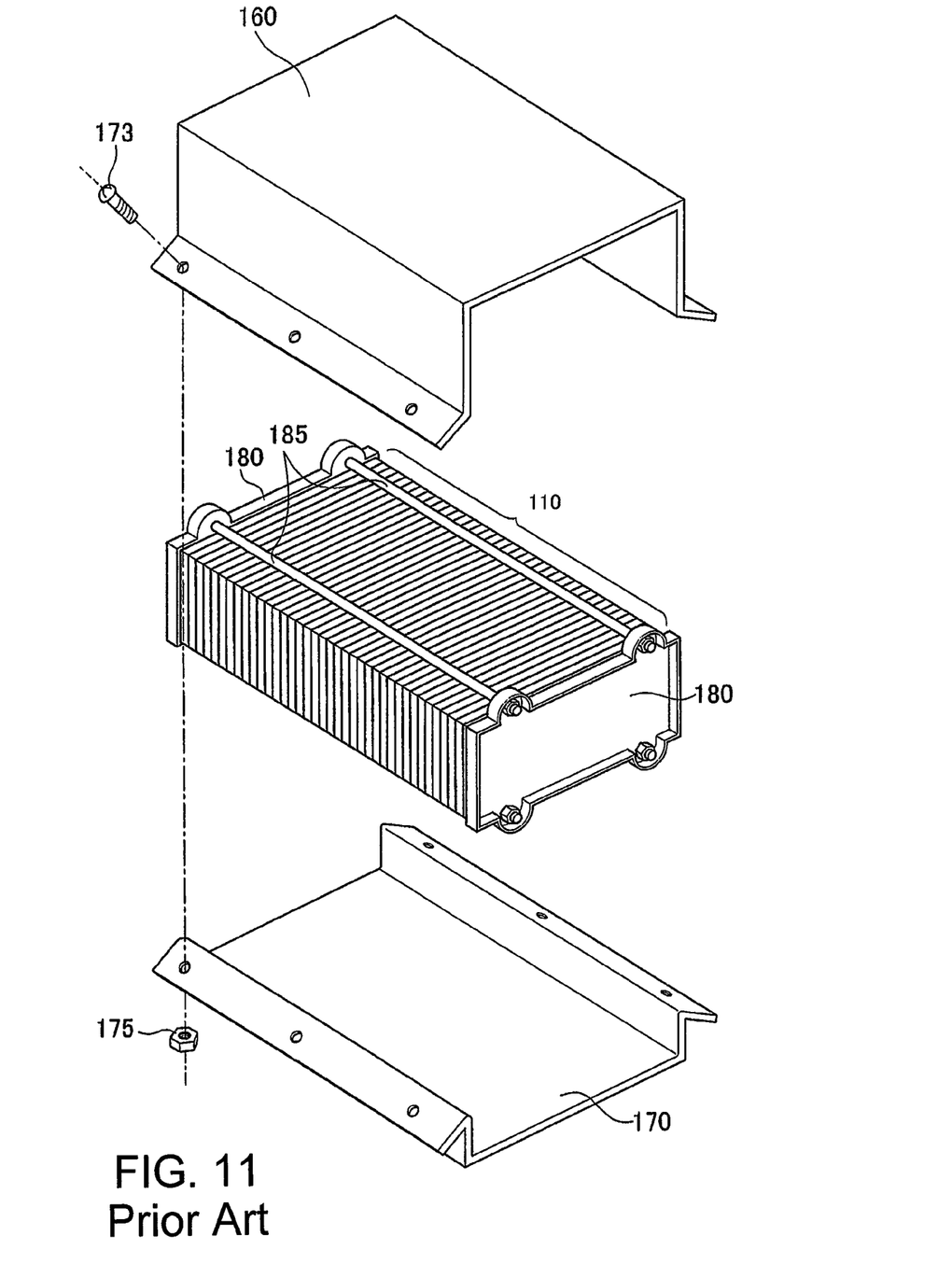
FIG. 11 is a diagram schematically showing a structure of a battery pack.

FIGS. 9-11 show a structure of a battery pack disclosed in WO 2006/087962 A1. FIG. 9 shows a structure of a holding spacer 130 which forms a part of the battery pack, FIG. 10 shows a structure of a battery module 110, and FIG. 11 shows a state of being assembled into a battery pack. A holding spacer 130 which holds the battery module 110 is placed between adjacent battery modules 110. The battery module 110 and the holding spacer 130 are overall constrained by two end plates (end boards) 180 and four constraining rods 185, to become an integrated structure. In addition, the battery module 110 and the holding spacer 130 are held by a first spacer support member (upper case) 160 and a second spacer support member (lower case) 170. The first spacer support member 160 and the second spacer support member 170 are fixed by a bolt 173 and a nut 175.

Each battery module 110 has an approximate rectangular parallelepiped shape including two opposing long side surfaces 110$a$ and 110$b$, two opposing short side surfaces 110$c$ and 110$d$, and two opposing end surfaces 110$e$ and 110$f$. The battery module 110 comprises a plurality (in the figures, eight) of cells 111 which are placed in one line. The cells 111 are connected in series with a safety valve facing toward a side of the short side surface 110$c$. An upper cover member 113 which covers each safety surface and which forms a gas discharge path with the cell case is placed on the side of the short side surface 110$c$ of the cells 111 connected in series. In addition, a negative electrode side cover member 115 is placed on the side of the end surface 110$e$ of the placed cell 111, and a positive electrode side cover member 117 is placed on the side of the end surface 110$f$. An external negative electrode terminal 116 which protrudes to the outside of the module is provided at an approximate center of the negative electrode side cover member 115, and an external positive electrode terminal 118 which protrudes to the outside of the module is provided at an approximate center of the positive electrode side cover member 117. A discharge hole 119 is provided at an upper section of the positive electrode side cover member 117, which is in communication with the gas discharge path formed between the upper cover member 113 and the cell cases.

The holding spacer 130 is placed between the battery modules 110 to hold the battery module 110, and forms, between the battery module 110 and the holding spacer 130, a cooling path through which a coolant is circulated. The holding spacer 130 comprises a spacer body 131 having an approximate plate shape and which is directly interposed between the battery modules 110. In the spacer body 131, a plurality of first module support sections 133 which support the short side surfaces 110$c$ of the adjacent battery modules 110 are provided on an end in a vertical direction Z. In addition, in the spacer body 131, a plurality of second module support sections 135 which support the short side surface 110$d$ of the adjacent battery modules 110 are provided on the other end in the vertical direction Z. The battery module 110 which is mounted on the holding spacer 130 is placed between the first module support section 133 and the second module support section 135, so that movement in the vertical direction Z is restricted. Moreover, in the spacer body 131, a plurality of third module support sections 137 which support the end surface 110$e$ or 110$f$ of the battery modules 110 that are placed adjacent to each other are provided on one end in a direction of placement X of the cells. In addition, in the spacer body 131, a plurality of fourth module support sections 139 which support the end surface 110$e$ or 110$f$ of the battery modules that are placed adjacent to each other are provided on the other end in the direction of placement X of the cells. The battery module 110 mounted on the holding spacer 130 is placed between the third module support section 137 and the fourth module support section 139, so that movement in the direction of placement X of the cells is restricted. Moreover, in the spacer body 131, a plurality of cooling path forming projections 141 are provided in order to form a cooling path for circulating coolant between long side surfaces 110$a$ and 110$b$ of adjacent battery modules 110. The cooling path forming projection 141 projects in a direction of placement Y of the module and extends in a straight line shape in the vertical direction Z. The long side surfaces 110$a$ and 110$b$ of the battery module 110 mounted on the holding spacer 130 contact the cooling path forming projections 141, to form the coolant path between the long side surfaces 110$a$ and 110$b$ and the spacer body 131. A first elastic member 143 and a second elastic member 145 are formed with rubber, and prevent free movement of the holding spacer 130. A plate-shaped rubber member 147 is held on the holding spacer 130 in a state where the rubber member 147 is elastically deformed in the direction of placement Y of the module and elastically contacts the long side surface 110$a$ or 110$b$ of the battery module 110. With this structure, the battery module 110 is elastically held by the holding spacer 130.

On the other hand, when the temperature is low, the output of the battery pack is reduced and sufficient performance cannot be achieved. In consideration of this, a technique has been proposed in which the battery pack is heated when the automobile is run under a very cold environment. For example, JP 2003-223938 A discloses a battery device in which a plurality of secondary batteries are heated by a sheet-shaped heat generating structure which uniformly generates heat over the entire surface.

Although provision of the sheet-shaped heat generating structure which uniformly generates heat over the entire surface is effective when the battery pack is to be heated in a cold climate, with a structure of simply adding the heat generating structure, the number of components is increased and the structure becomes more complex. Therefore, a structure is desired to reliably heat the battery pack in the cold climate and to achieve superior performance of the battery pack while maintaining the already-existing structure of the battery pack as much as possible.

SUMMARY OF THE INVENTION

According to one aspect of the present invention, there is provided a battery pack comprising a plurality of battery modules, and a holding spacer which is placed between the battery modules and holds the battery module, wherein, in the holding spacer, a plurality of projections which contact the battery module and hold the battery module are formed, a cooling path through which a coolant is circulated is formed in a part where the projection is not formed, and a heat generating unit which heats the battery module is provided.

According to another aspect of the present invention, it is preferable that, in the battery pack, the heat generating unit is embedded in the holding spacer.

According to another aspect of the present invention, it is preferable that, in the battery pack, a hollow section is formed in the holding spacer, and the heat generating unit is inserted into the hollow section.

According to another aspect of the present invention, it is preferable that, in the battery pack, the heat generating unit has a greater amount of heat generation at a periphery section of the battery pack than at a center section of the battery pack.

According to various aspects of the present invention, because the heat generating unit is provided in the holding spacer itself, it is possible to reliably heat the battery module and prevent performance degradation under low temperature in a cold climate or the like without increasing the number of components. The holding spacer of various aspects of the present invention has a holding function for the battery module, a cooling path forming function, and a heating function for the battery module.

DESCRIPTION OF THE PREFERRED EMBODIMENT

A preferred embodiment of the present invention will now be described with reference to the drawings.

Figure 1:
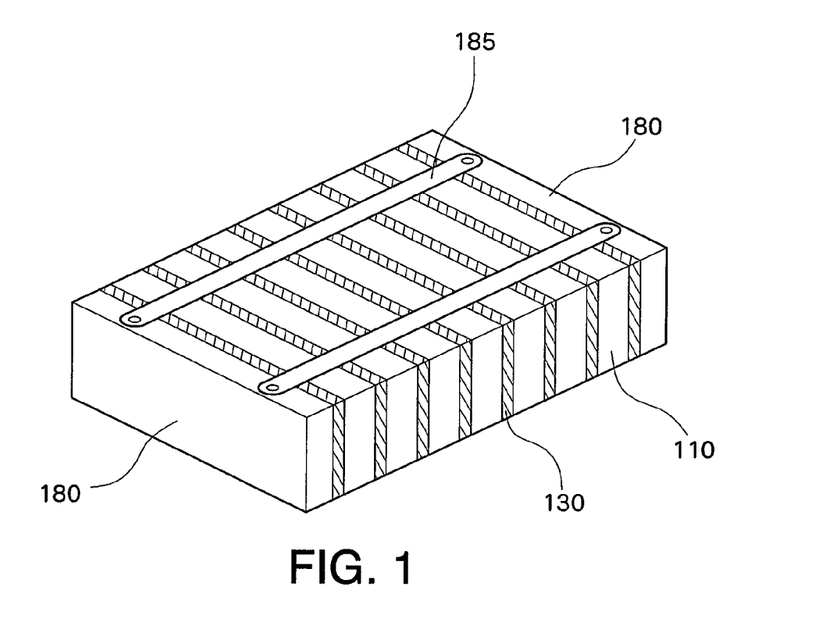
FIG. 1 is a perspective view of a battery pack according to a preferred embodiment of the present invention.

FIG. 1 shows a structure of a battery pack in a preferred embodiment of the present invention. The outer appearance shape is similar to that of the battery pack of the related art shown in FIG. 11, and a holding spacer 130 which holds battery modules 110 is placed between the battery modules 110. A cooling path through which a coolant is circulated is formed between the battery module 110 and the holding spacer 130. The battery module 110 and the holding spacer 130 are integrally restrained by two endplates (end boards) 180 and four restraining rods (or restraining bands) 185 to form an integrated structure. As shown in FIG. 10, each battery module 110 has an approximate rectangular parallelepiped shape with two opposing long side surfaces 110a and 110b, two opposing short side surfaces 110c and 110d, and two opposing end surfaces 110e and 110f. The battery module 110 comprises a plurality (in the figures, 8) of cells 111 which are placed in one line. The cells 111 are connected in series with the safety valve facing toward the side of the short side surface 110c. The following advantages can be achieved by such a structure with a rectangular parallelepiped shape of the battery module 110 and the holding spacer 130, and in which the components are integrated by sandwiching both ends with end plates and with restraining rods 185 or the like. Because a rectangular parallelepiped-shaped (flat sheet-shaped) battery module 110 and a rectangular parallelepiped-shaped (flat sheet-shaped) holding spacer 130 are bound and pressured in the stack direction, the thermal resistance between the battery module 110 and the holding spacer 130 is small, and a more significant effect can be achieved when a coolant path forming projection 141 to be described later is used as a heat conduction structure. In addition, because the heat exchange between the coolant and the holding spacer 130 when the coolant passes through the cooling path is facilitated, this structure is effective in increasing the in-vehicle temperature using the coolant discharged from the battery cell. Moreover, because the holding spacer has a flat sheet shape, a sheet-shaped heat generating structure can be effectively used. Furthermore, an area of each coolant path forming projection 141 which contacts the battery module 110 can be reduced, and thus the degree of load of each cooling path forming projection 141 can be reduced and a projection placement design which is optimized with regard to heat can be easily employed.

The holding spacer 130 is formed with a resin having an electrical insulating characteristic, and is placed between the battery modules 110 to hold the battery modules 110, and a cooling path through which a coolant is circulated is formed between the battery module 110 and the holding spacer 130. In the related art, the holding spacer 130 has such a function of holding the battery module 130 and the function of forming the cooling path. In the present embodiment, in addition to these functions, the holding spacer 130 also has a heating function to uniformly heat the battery module 110 and prevent reduction in performance when the environment temperature of the battery module 110 is low and less than or equal to a predetermined temperature.

Figure 2:
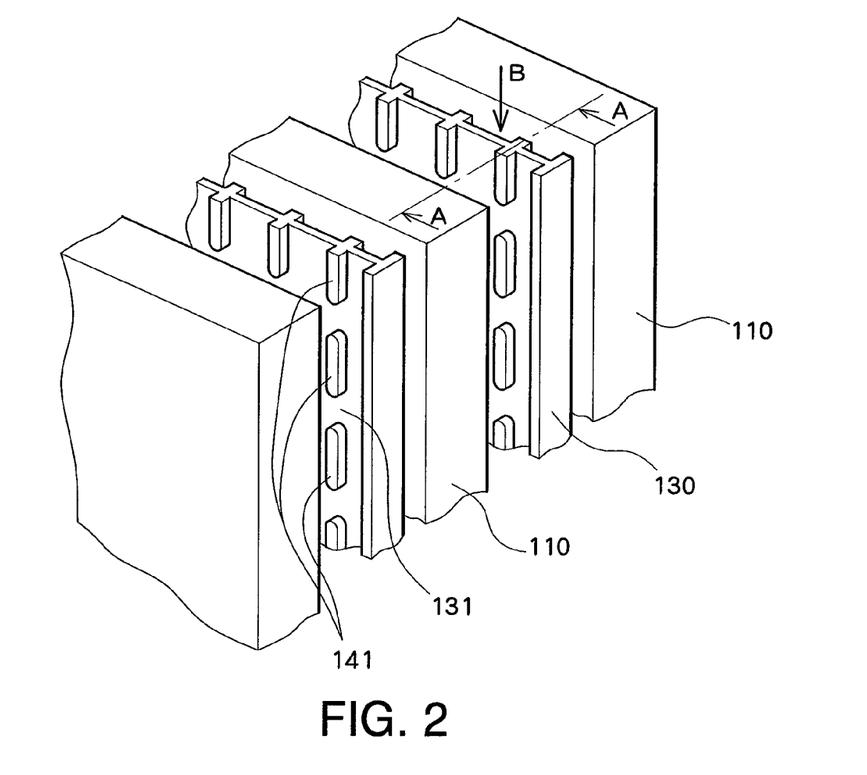
FIG. 2 is a partial enlarged view of FIG. 1.

FIG. 2 is a partial enlarged view of FIG. 1. The holding spacer 130 comprises a spacer body 131 and the cooling path forming projection 141. The cooling path forming projections 141 project in a direction of placement of the module and extend in a straight line shape along a direction perpendicular to this direction. The long side surfaces 110a and 110b of the battery module 110 mounted on the holding spacer 130 contact these cooling path forming projections 141, so that a cooling path is formed between the long side surfaces 110a and 110b and the spacer body 131. On the other hand, a sheet-shaped heat generating structure is embedded in the spacer body 131 so that the battery module 110 can be heated by the heat of the sheet-shaped heat generating structure.

Figure 3:
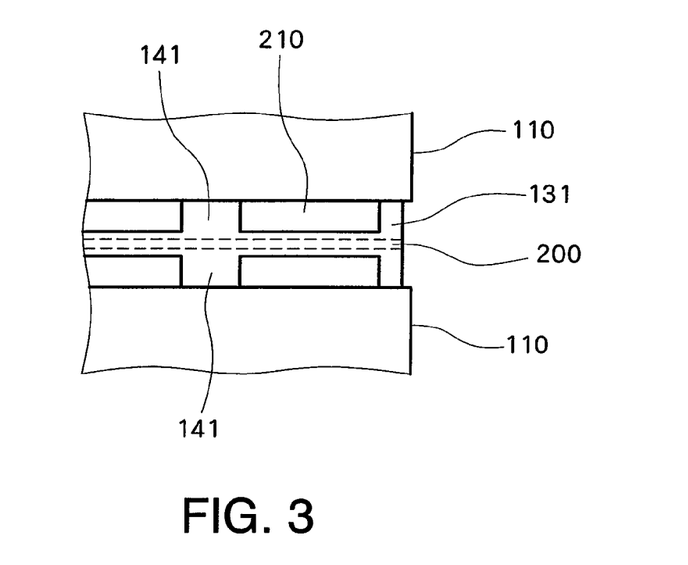
FIG. 3 is an outer appearance view of FIG. 2 viewed from direction B.
Figure 4:
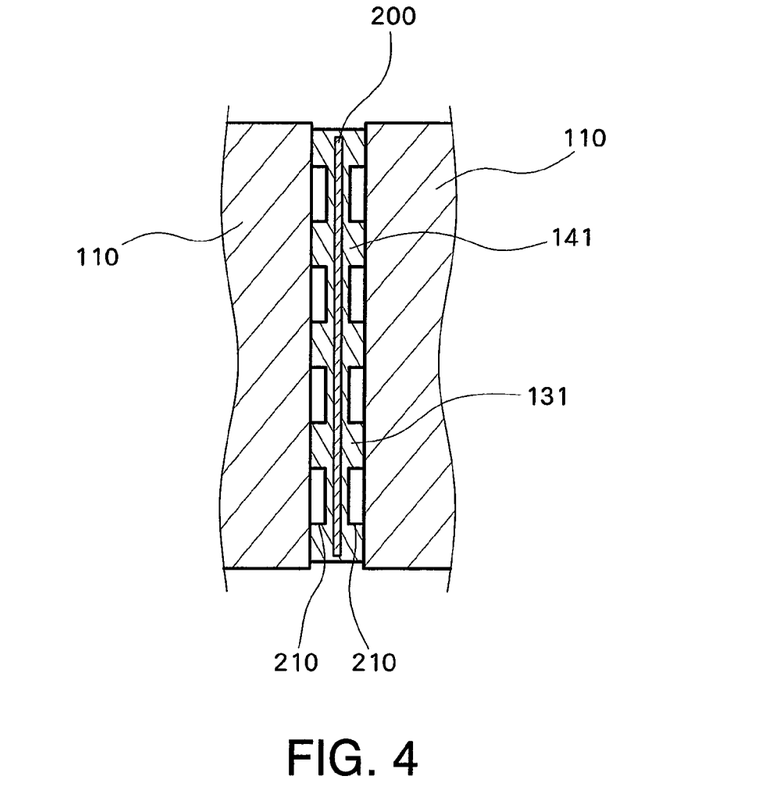
FIG. 4 is an A-A cross sectional view of FIG. 2.

FIG. 3 is an outer appearance view of FIG. 2 viewed from direction B. FIG. 4 shows an A-A cross section of FIG. 2. The battery module 110 is held by the holding spacer 130 between adjacent battery modules 110 and a cooling path 210 is formed between the spacer body 131 and the battery module 110 by the cooling path forming projections 131 provided on the spacer body 131 of the holding spacer 130. A coolant is circulated through the cooling path in the direction B of FIG. 2, and the battery module 110 is cooled. A sheet-shaped heat generating structure 200 is embedded in the spacer body 131, as shown by a broken line in the figures, and heat is generated by applying electricity through the sheet-shaped heat generating structure. The sheet-shaped heat generating structure 200 is embedded over approximately the entire surface of the spacer body 131. In addition, the sheet-shaped heat generating structure 200 is embedded at an approximate center position of the spacer body 131 so that the distances to adjacent battery modules 110 are almost equal. Because the cooling path forming projections 141 projecting from the spacer body 131 are in contact with the long side surfaces 110a and 110b of the battery modules 110, the heat from the sheet-shaped heat generating structure is efficiently conducted to the battery module 110 through the cooling path forming projection 141 and the battery module 110 is quickly heated. In addition, the cooling path 210 extends along a vertical direction Z and the battery module 110 is quickly and uniformly heated by heat convection through the cooling path 210. For the sheet-shaped heat generating structure 200, an arbitrary material which is heated by applying electricity, such as a resistor and a semiconductor, may be used.

Control of the application of electricity to the sheet-shaped heat generating structure may be automatic or may be manual. For example, a temperature sensor may be provided at a predetermined position of the battery pack, electricity may be applied to the sheet-shaped heat generating structure 200 when the temperature detected by the temperature sensor is less than or equal to a predetermined temperature, and the electricity application may be stopped when the detected temperature becomes greater than or equal to a predetermined temperature. The battery module 110 desirably has a temperature which is greater than or equal to a predetermined temperature and the temperature distribution among the plurality of battery modules 110 placed in the battery pack is desirably uniform. Therefore, it is desirable to detect a temperature distribution of the battery modules 110 in the battery pack with a plurality of temperature sensors provided at a plurality of predetermined positions of the battery pack, and to stop the electricity application when the temperature is greater than or equal to a predetermined temperature and the temperature distribution becomes uniform.

Alternatively, the electricity may be applied to the sheet-shaped heat generating structure 200 by a user of the vehicle such as an electronic vehicle or a hybrid electric vehicle on which the battery pack is equipped manually operating a switch in the cold climate. For the electric power to be applied to the sheet-shaped heat generating structure 200, for example, a commercial power supply may be used. In a cold climate, when the vehicle is parked in a garage of the user's home (no coolant flows in the cooling path), the vehicle may be connected to the commercial power supply through a plug, and electricity may be applied to the sheet-shaped heat generating structure 200 by the electric power from the commercial power supply. With this configuration, as each battery module can be heated even under a low-temperature environment, a superior output can be obtained as a power supply of the vehicle at the time of startup of the vehicle.

Figure 5:
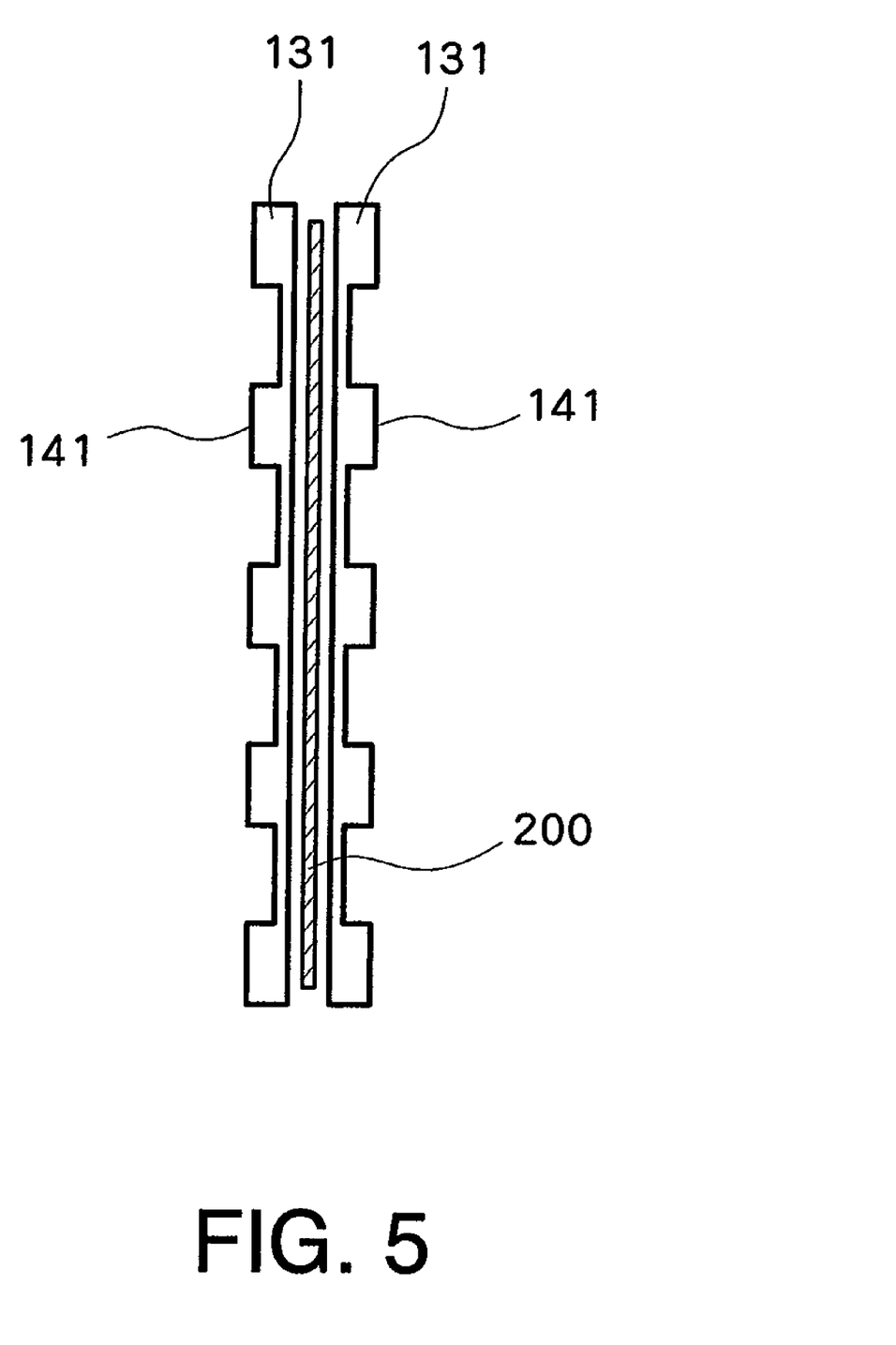
FIG. 5 is a diagram showing another structure of a holding spacer.

In the above-described preferred embodiment, a configuration is exemplified in which the sheet-shaped heat generating structure 200 is embedded in the spacer body 131. In this structure, the holding spacer 130 and the sheet-shaped heat generating structure 200 are integrated. Alternatively, a configuration may be employed in which the holding spacer 130 and the sheet-shaped heat generating structure 200 are separated. FIG. 5 shows the holding spacer 130 of a separated type. The spacer body 131 of the holding spacer 130 is separated into two components, and the cooling path forming projections 141 are formed on a surface of each component. The sheet-shaped heat generating structure 200 is placed between the two separated components of the spacer body 131.

Figure 6:
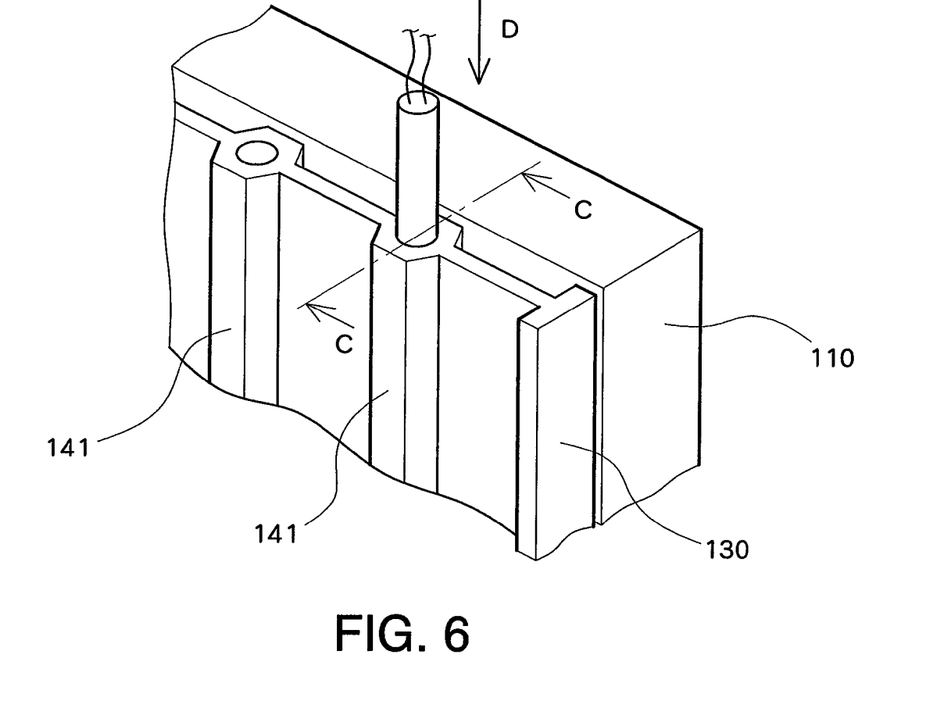
FIG. 6 is a partial perspective view showing another structure of the holding spacer.
Figure 7:
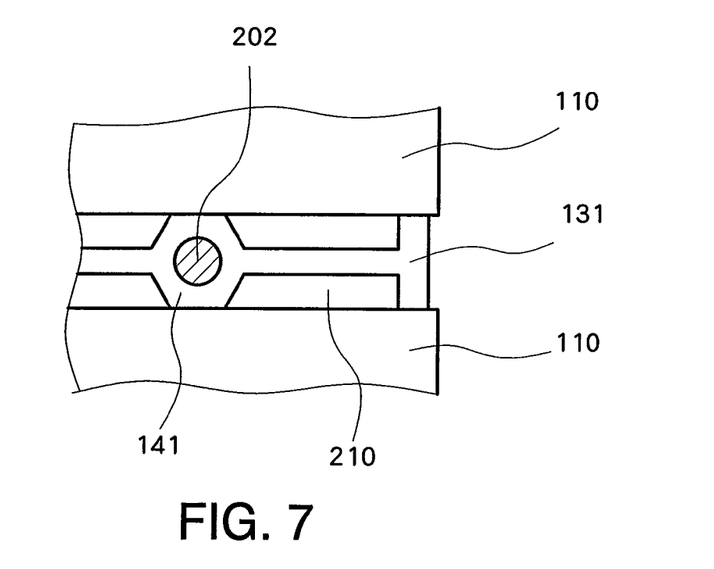
FIG. 7 is an outer appearance view of FIG. 6 viewed from direction D.
Figure 8:
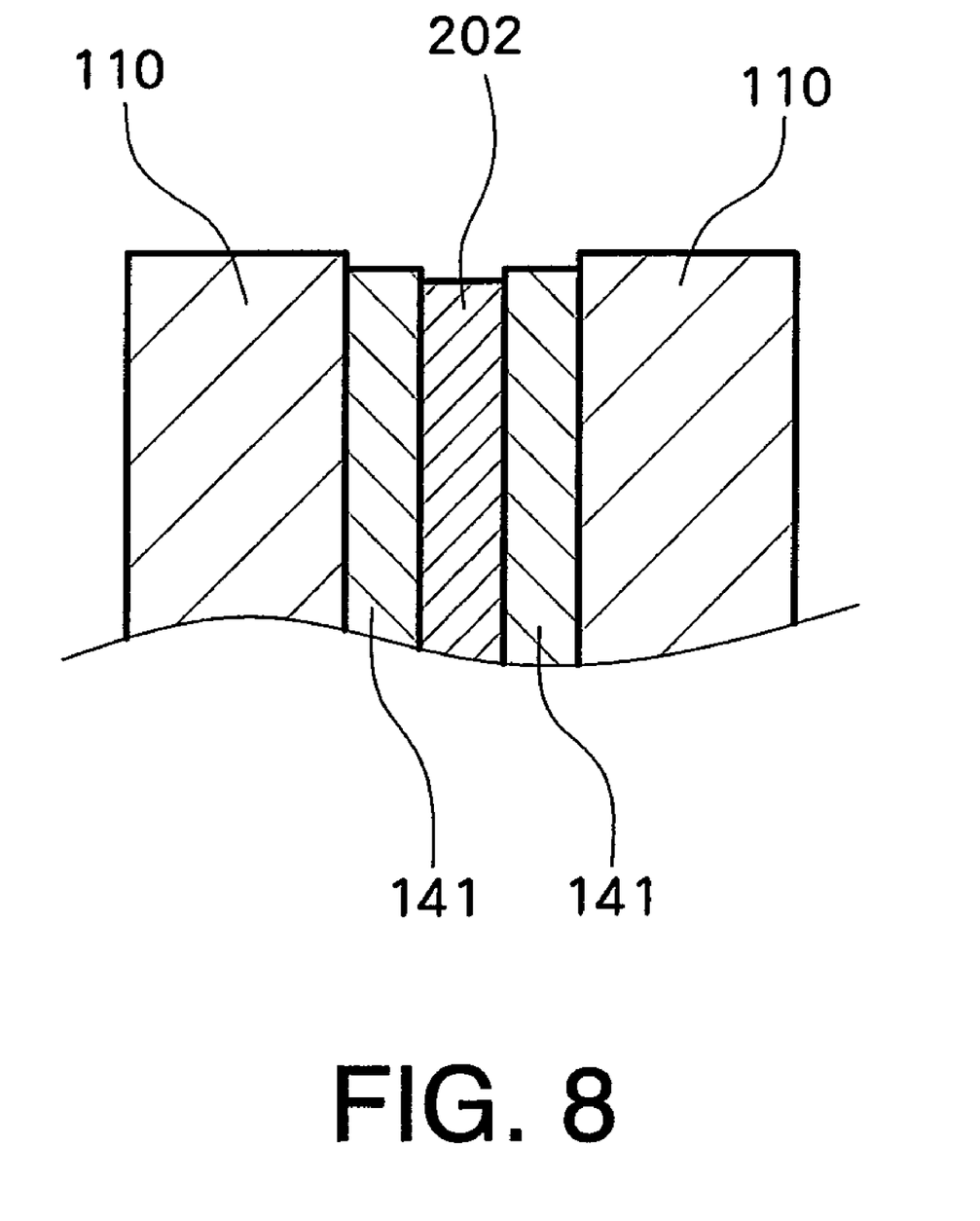
FIG. 8 is a C-C cross sectional view of FIG. 6.

FIG. 6 shows another structure of the holding spacer 130 having a heat generating function. FIG. 7 is an outer appearance view of FIG. 6 viewed from direction D and FIG. 8 is a C-C cross sectional view of FIG. 6. The holding spacer 130 which is an electrically insulating structure has the cooling path forming projection 141 which projects in a direction of placement Y of the battery modules 110. The cooling path forming projection 141 has a hollow polygonal column shape and extends along a vertical direction Z, projects from the spacer body 131, contacts the long side surfaces 110a and 110b of the battery module 110, and holds the battery module 110. In addition, a gap is provided between the adjacent cooling path forming projections 141 having a hollow polygon column shape, and a cooling path 210 is formed by the gap. The spacing between the hollow polygon column-shaped cooling path forming projections 141 is, for example, approximately the same as the spacing between the cooling path forming projections 141 shown in FIG. 2. The cooling path forming projection 141 of the present embodiment can be considered as a structure obtained by connecting a plurality of cooling path forming projections 141 provided along a vertical direction shown in FIG. 2, and making the inside hollow.

A linear or a tubular heat generating structure 202 is inserted into the hollow portion of the hollow polygon column-shaped cooling path forming projection 141. The battery module 110 is heated by applying electricity to the inserted linear or tubular heat generating structure 202. In the present embodiment also, because the hollow polygon column-shaped cooling path forming projections 141 are in contact with the long side surfaces 110a and 110b of the battery modules 110, the heat from the heat generating structure 202 can be efficiently conducted to the battery module 110 through the hollow polygon column-shaped cooling path forming projection 141, and the battery module 110 can be quickly heated. The size of the linear or tubular heat generating structure 202 is desirably set to be approximately identical to the size of the hollow portion. The linear or tubular heat generating structure 202 can be freely inserted into and taken out from the hollow portion of the cooling path forming projection 141. Therefore, it is not necessary to prepare, as the battery pack, two separate types of battery packs including a normal specification equipped with the holding spacer which does not have the heat generating structure and a cold climate specification equipped with the holding spacer having a heat generating structure integrally formed with the holding spacer, and the battery pack may be easily changed to the cold climate specification by inserting the heat generating structure 202 into the hollow portion of the spacer body 131 of the battery pack of the normal specification equipped with the holding spacer which does not have the heat generating structure.

As described, in the present embodiment, by adding the function to heat the battery module 110 to the functions of the holding spacer 130 to hold the battery module 110 and to form the cooling path for cooling the battery module 110, it is possible to quickly heat the battery module 110 and prevent performance degradation in a low temperature environment while preventing increase in the number of components.

The present invention is not limited to the above-described preferred embodiment, and other configurations may be employed.

For example, in the preferred embodiment, as shown in FIGS. 3 and 4, one sheet-shaped heat generating structure 200 is placed in the spacer body 131, but the number of the sheet-shaped heat generating structure 200 does not need to be 1, and a plurality of sheet-shaped heat generating structures may be embedded in the spacer body 131 in a predetermined placement relationship. For example, band-shaped heat generating structures may be placed with a predetermined spacing.

In addition, in the preferred embodiment, as shown in FIGS. 3 and 6, the heat generating structure is placed in the spacer body 131. Alternatively, the heat generating structure may be provided on the surface of the spacer body 131. For example, the heat generating structure may be provided on the contact surface of the cooling path forming projection 141 with the battery module 110 in FIG. 2. More specifically, a sheet-shaped heat generating structure of a strip shape may be adhered or welded on the cooling path forming projection 141 extending in a straight line shape in a direction Z perpendicular to the direction of placement of the module. Of the surfaces of the spacer body 131, it is also possible to provide the heat generating structure on the surface forming the cooling path 210. In this case, the size of the heat generating structure is desirably inhibited to a degree to not significantly increase the flow path resistance of the cooling path 210. In other words, it is sufficient to not provide the heat generating unit separately from the holding spacer 130, but rather, provide the heat generating unit integrally with the holding spacer 130, more specifically, on a surface of the inside of the holding spacer 130.

Figure 12:
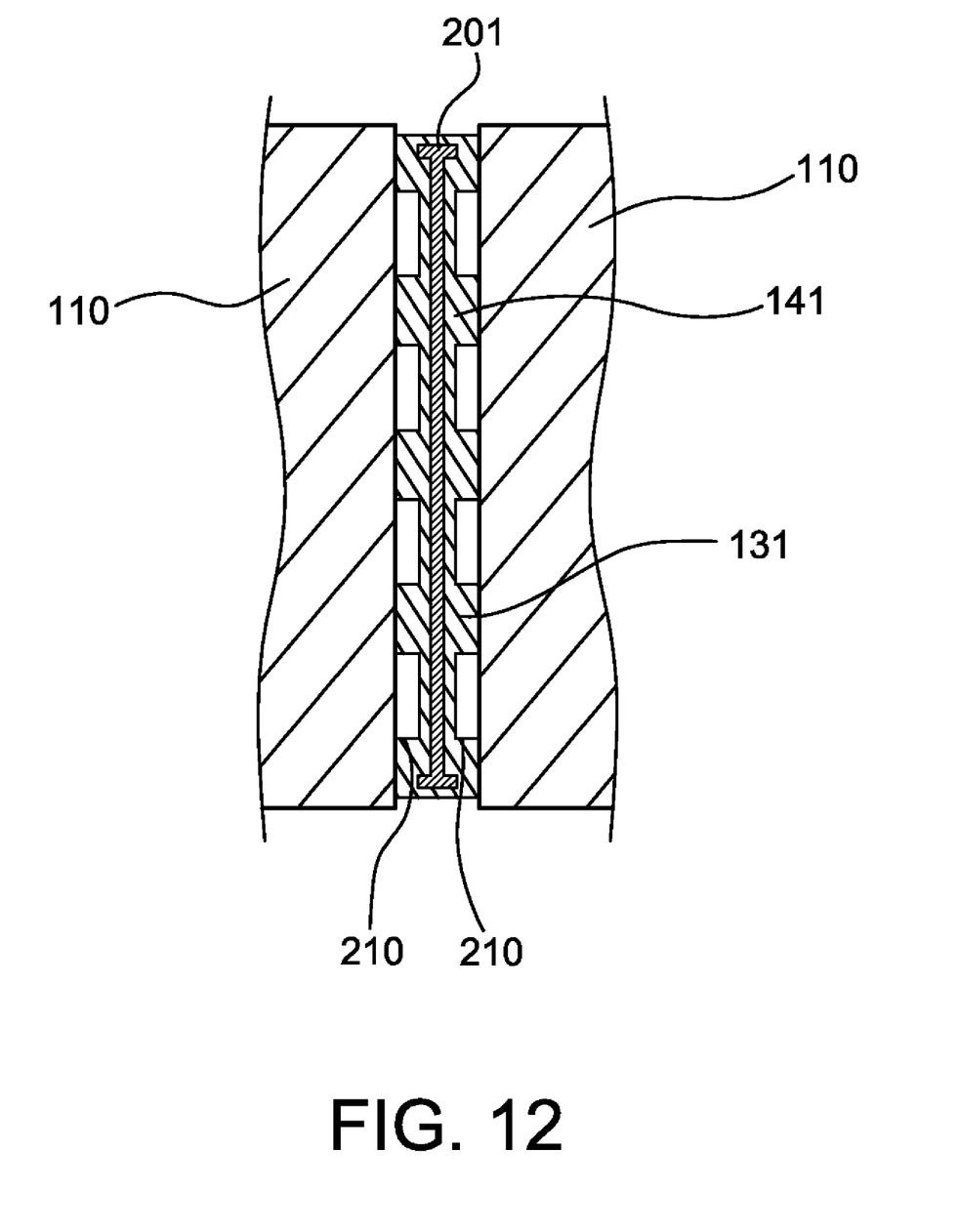
FIG. 12 is an A-A cross-sectional view of FIG. 2, according to another embodiment of the present invention.

In the preferred embodiment, although a sheet-shaped heat generating structure 200 or a linear or tubular heat generating structure 202 is used as the unit for heating the battery module 110, the shape is not limited. In addition, in a cold climate, the battery pack has a lower temperature at an outer position with respect to an axis of symmetry, that is, at a more peripheral section than the center section of the battery pack. Therefore, the shape of the heat generating structure may be changed such that the amount of heat generation at the peripheral section of the battery pack is greater than that of the center section. For example, in FIG. 12, the placement area of the sheet-shaped heat generating structure 201 may be increased for the peripheral section or the linear or tubular heat generating structure 202 may be narrowed at the peripheral section. Alternatively, the same shape may be employed for the heat generating structure, and the applied current may be increased at the peripheral section. Moreover, the holding spacer 130 is formed with an electrically insulating resin, and it is preferable to add calcium oxide, titanium oxide, silicon oxide, zinc oxide, silicon nitride, aluminum nitride, etc., in the resin to achieve a heat conductive characteristic.

What is claimed is:

1. A battery pack comprising:
a plurality of battery modules; and
a holding spacer which is placed between any two of the battery modules, wherein
the holding spacer has a spacer body;
in the holding spacer, a plurality of projections which protrude in a direction of placement of the plurality of battery modules and extend in a straight line shape in a vertical direction and which contact a side surface of at least one battery module and hold the battery module are formed, a cooling path through which a coolant is circulated is formed so as to extend in the vertical direction in a part where the projection is not formed, and a heat generating unit which heats the battery module is present within the spacer body; and
the spacer body is placed between one side of the heat generating unit and one of the two battery modules and between the other side of the heat generating unit and the other of the two battery modules.

2. The battery pack according to claim 1, wherein the heat generating unit is embedded in the holding spacer.

3. The battery pack according to claim 1, wherein a hollow section is formed in the holding spacer, and the heat generating unit is inserted into the hollow section.

4. The battery pack according to claim 3, wherein the projection of the holding spacer is a hollow column-shaped projection which extends in a direction perpendicular to a direction of placement of the battery modules.

5. The battery pack according to claim 1, wherein the heat generating unit has a greater amount of heat generation at a peripheral section of the battery pack than at a center section of the battery pack.

6. The battery pack according to claim 1, wherein the battery module has a rectangular parallelepiped shape including a plurality of cells placed in a line.

7. The battery pack according to claim 6, wherein the battery module and the holding spacer are integrated by being sandwiched by end plates at both ends and restrained overall by a restraining unit.

* * * * *